(Model.)

W. S. APPLEGET.
PLATFORM GEAR FOR WAGONS.

No. 277,186.            Patented May 8, 1883.

WITNESSES:            INVENTOR:
Chas. Nida            W. S. Appleget
C. Sedgwick            BY Munn & Co.
                                ATTORNEYS.

UNITED STATES PATENT OFFICE.

WILLIAM S. APPLEGET, OF CRANBURY, NEW JERSEY.

PLATFORM-GEAR FOR WAGONS.

SPECIFICATION forming part of Letters Patent No. 277,186, dated May 8, 1883.

Application filed February 24, 1883. (Model.)

*To all whom it may concern:*

Be it known that I, WILLIAM S. APPLEGET, of Cranbury, in the county of Middlesex and State of New Jersey, have invented a new and useful Improvement in Gearings for Platform-Wagons, of which the following is a full, clear, and exact description.

Reference is to be had to the accompanying drawings, forming a part of this specification, in which similar letters of reference indicate corresponding parts in all the figures.

Figure 1:
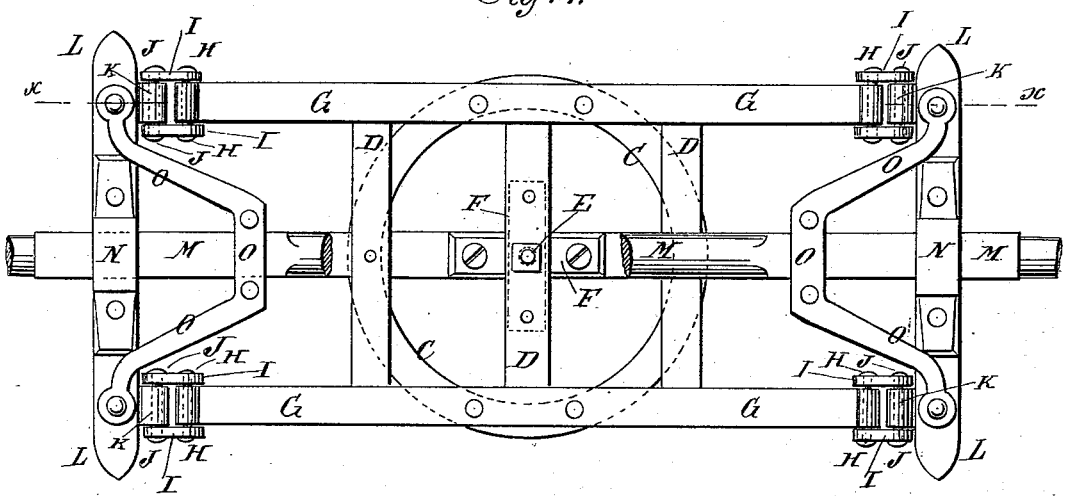
Figure 2:
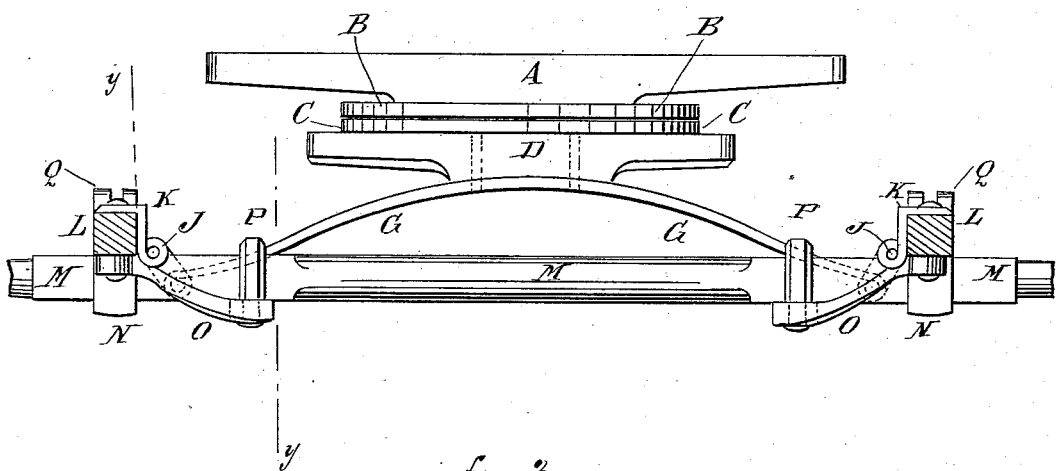
Figure 3:
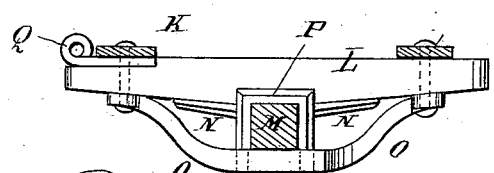

Figure 1 is a bottom view of a part of a wagon-gearing illustrating my improvement, part of the axle being broken away. Fig. 2 is a sectional elevation of the same, taken through the line $x\ x$, Fig. 1. Fig. 3 is a sectional side elevation of the same, taken through the line $y\ y$, Fig. 2.

The object of this invention is to give greater firmness and security to the gearings of platform-wagons.

A are the bars to which the wagon-body is designed to be attached, and to the lower sides of which is attached the upper part, B, of the fifth-wheel. The upper part, B, of the fifth-wheel rests and slides upon the lower part, C, which is attached to the platform D. The parts B C of the fifth-wheel are kept in place upon each other by the king-bolt E, which passes through the center of the middle bar A and the center of the middle bar of the platform D, the space between the said bars being taken up by wear-plates F, attached to the said bars and provided with bosses or washers. The front and rear bars of the platform D are bolted to the middle parts of the half-elliptical springs G, the ends of which have eyes formed in them to receive the bolts or rivets H, which also pass through the inner ends of short bars or links I. Through the outer ends of the links I pass the bolts or rivets J, which also pass through eyes in the inner ends of the straps K. The straps K are bent at an angle to fit upon the inner and upper sides of the ends of the bars L, to which they are secured by bolts or rivets. The centers of the bars L rest upon the end parts of the axle M, to which they are secured by clips N, so as to be held firmly in place. The connection between the bars L and the axle M is strengthened by braces O, the centers of which are secured by clips P to the axle M at a little distance from the bars L, and upon either the inner or the outer sides of the said bars, as may be desired. The braces O, at the opposite sides of the axle M, are inclined toward the ends of the bars L, and the ends of the said braces are secured to the ends of the said bars by the bolts or rivets that secure the angle-straps K, or by separate bolts or rivets, as may be desired.

The rear part of the wagon-body is designed to be secured to the rear axle by half-elliptical springs, shackles, bars, and braces in the same manner that the platform D is connected with the forward axle.

The pole-couplings Q are secured to the forward ends of the bars L by the bolts or rivets that secure the angle-straps K to the said bars, or by separate bolts or rivets, as may be desired, so that the draft will be applied directly to the axle.

Having thus fully described my invention, I claim as new and desire to secure by Letters Patent—

The combination, with the axles and platform, of the half-elliptic springs G, the braces O, the bars L, and the pole-couplings Q, all connected and arranged substantially as shown and described.

WILLIAM S. APPLEGET.

Witnesses:
 JO. H. JOHNES,
 CHAS. APPLEGATE.